United States Patent [19]

Lochridge et al.

[11] 3,747,356

[45] July 24, 1973

[54] METHOD OF ARRESTING THE PROPAGATION OF A BUCKLE IN A PIPELINE

[75] Inventors: Joe C. Lochridge; Tony Leon Gibson, both of Houston, Tex.

[73] Assignee: Brown & Root, Inc., Houston, Tex.

[22] Filed: Apr. 7, 1972

[21] Appl. No.: 242,017

[52] U.S. Cl.................... 61/72.3, 61/72.6, 72/150, 138/172, 138/175
[51] Int. Cl................................................ F16l 1/00
[58] Field of Search.................. 61/72.3, 72.1, 72.5, 61/72.6, 72.7, 72.2, 72.4; 138/172, 174; 72/150

[56] References Cited
UNITED STATES PATENTS

| | | | |
|---|---|---|---|
| 3,589,136 | 6/1971 | Sorenson | 61/72.3 |
| 3,620,028 | 11/1971 | Wilde | 61/72.3 |
| 3,656,310 | 4/1972 | Brun | 61/72.3 |

*Primary Examiner*—Jacob Shapiro
*Attorney*—Joel M. Freed

[57] ABSTRACT

A method is provided for arresting the propagation of a buckle or other cross-sectional deformity which occurs in a pipeline during underwater pipeline laying operations. A substantially rigid buckle arresting means of sufficient strength to withstand the forces tending to propagate a buckle along the longitudinal axis of a pipeline is introduced into the interior of a portion of pipeline and in the event that a buckle occurs, the buckle arresting means engages with the buckle propagating therealong so as to arrest longitudinal propagation of that buckle. The buckle arresting means can remain engaged with the buckle and thereby prevent further propagation until repair operations are commenced. The buckle or non-buckle condition of the pipeline may be continuously monitored utilizing the buckle arresting means as a buckle detecting means.

8 Claims, 4 Drawing Figures

PATENTED JUL 24 1973　　　　　　　　　　　　　3,747,356
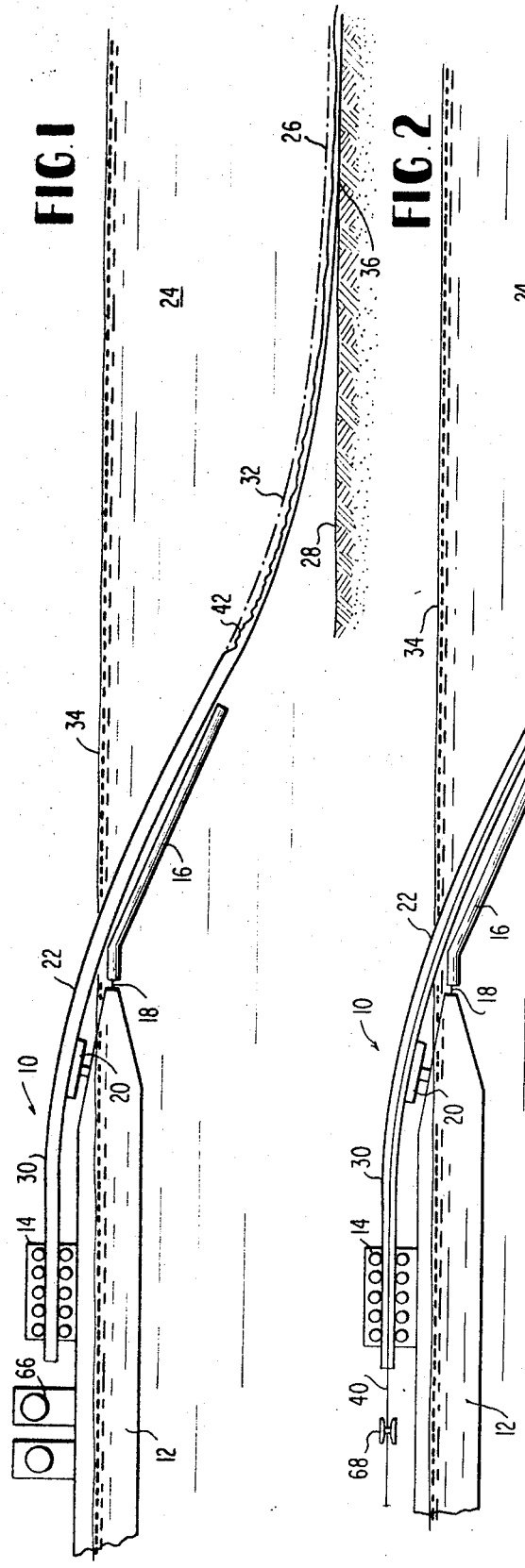
FIG. 1
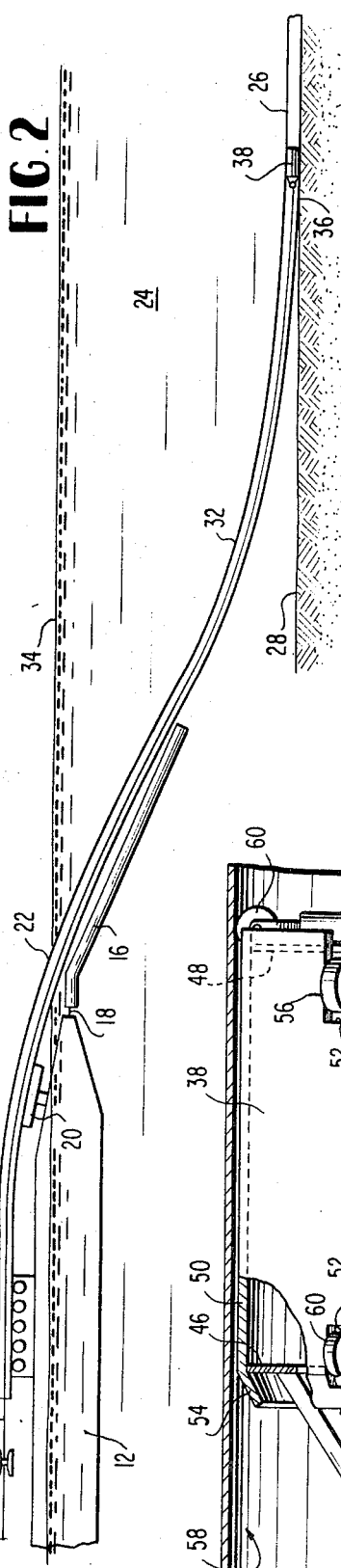
FIG. 2
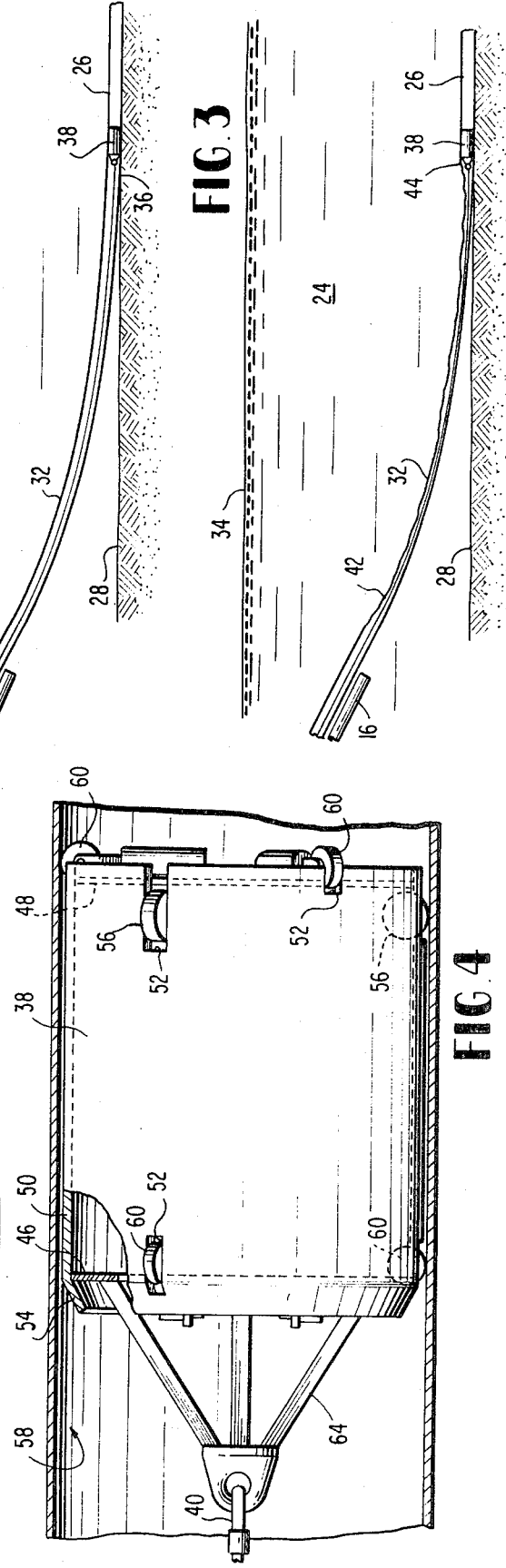
FIG. 3
FIG. 4

METHOD OF ARRESTING THE PROPAGATION OF A BUCKLE IN A PIPELINE

BACKGROUND OF THE INVENTION

The present invention relates to the laying of a pipeline along the floor of a deep body of water. More particularly, the invention is directed to the detection of a buckle in a pipeline being laid on a submerged surface and to the immediate arresting of the propagation of such a buckle upon its detection.

When laying pipeline along the floor of a deep body of water, the problem of avoiding pipeline buckling or kinking and excessive bending during a laying operation, while staying within the stress limits of the pipeline, is ever present and difficult to overcome. Such buckling may occur as a result of the fact that very long continuous lengths of pipeline, typically ranging in hundreds of feet, must be lowered from the surface of the body of water to the floor thereof and that controlled movement of such lengths is very difficult. Pipelines subjected to combined bending and relatively high external pressure from the body of water may develop a buckle transverse to the pipe axis.

When the pipeline is subjected to external pressure above a critical value, the pipeline may collapse, or buckle, into a U-shaped cross section. The buckle has a tendency to travel in a direction parallel to the longitudinal axis of the pipeline. Once a collapse or buckle has occurred, a minimal pressure differential resulting from very little external pressure will often sustain the propagation of the buckle along the length of the pipeline.

In fact, the buckle may propagate over considerable lengths of pipeline, and a very time consuming and expensive operation may be required to replace pipeline damaged by buckling. At times, when it has not been feasible to raise a pipeline portion containing a buckle from its underwater location, it has been necessary to go to the extreme measure of either cutting out the buckled portion and effecting underwater repairs or raising to the surface the entire portion of the pipeline extending from the buckled area to a free end or terminus of the pipeline.

Such repair operations may entail several hundred thousands of dollars in cost. In addition, such repair operations significantly delay the placing of a pipeline in operating condition and reduce the overall operating efficiency of a pipeline laying operation.

Traditionally, a buckle will not be detected until the pipeline laying operation has been completed and a final inspection has been performed. U.S. Pat. application Ser. No. 147,834, filed by Raymond Jones on May 28, 1971 and assigned to the assignee of the present application, discloses a method and apparatus for evaluating the operation of an offshore pipeline laying activity by the immediate detection of the existence of a buckle or other unsatisfactory condition requiring the replacement of sections of the pipeline at the time that the pipeline is being laid.

According to the present invention, a method for arresting the propagation of a buckle in a pipeline being laid upon the detection of a buckle is provided.

Under the present state of the art, one method of preventing the propagation of a buckle occurring in a pipeline being laid on a submerged surface may entail providing the pipe with an increased wall thickness in deep water areas wherein buckles are most likely to occur. Utilizing pipe sections having an increased wall thickness can add an appreciable cost when laying a long pipeline on a submerged surface.

OBJECTS AND SUMMARY OF THE INVENTION

It is, therefore, an object of the invention to provide a novel technique for arresting the propagation of a buckle in a pipeline.

It is a further object of the invention to provide such a technique wherein such buckle in a pipeline is arrested upon detection of the buckle.

It is yet another object of this invention to provide such a technique while also eliminating substantial cost previously envisioned in efforts to prevent the propagation of a buckle in a pipeline being laid on a submerged surface.

It is a further object of this invention to provide such a technique while also reducing the time, and the cost associated therewith, required to repair a buckle which has occurred in a pipeline being laid on a submerged surface.

In a preferred form of the invention intended to accomplish at least some of the foregoing objects, the pipeline is supported such that an upper portion is supported by a floating vessel, a lower portion lays on a submerged surface, and an intermediate submerged portion is supported in a body of water between the upper and lower portion. A buckle arresting means in then introduced into the interior of the intermediate or lower pipeline portions.

The buckle arresting means may comprise a pair of mutually spaced circular discs enclosed by a cylindrical body having a frustoconical engagement shoulder at at least one end thereof. The buckle arresting means is movable through the interior of the pipeline so as to engage with a buckle occurring in the pipeline and by so engaging prevent the propagation of the buckle along the pipeline. The buckle arresting means is fabricated from suitable materials having sufficient strength to withstand the forces tending to propagate the buckle along the pipeline. The buckle arresting means may be constructed so as not to be damaged by the buckle forces.

The buckle arresting means can remain engaged with the buckle until the damaged portion of the pipeline is removed or repaired and normal operations resumed.

When the pipeline laying operation proceeds buckle-free, the buckle detecting means may, upon relative movement with respect to the pipeline interior during pipeline payout, function as a buckle detecting means, thereby providing a continuous monitor of pipeline condition. At the same time, the buckle arresting means provides impedance against the propagation of any buckles that may thereafter be generated.

In describing the invention, reference will be made to a preferred embodiment by way of example. However, it will be recognized that the preferred example is not limiting with respect to the scope of the invention insofar as the buckle arresting apparatus is concerned, or insofar as pipe laying or retrieving apparatus is concerned.

The foregoing and other objects of the invention and the specifics thereof will be more fully understood from the following detailed description when taken in conjunction with the accompanying drawings, wherein:

THE DRAWINGS

FIG. 1 schematically depicts an offshore pipeline laying operation wherein an intermediate portion of the pipeline has been overstressed so as to generate a buckle which has propagated along a length of pipeline;

FIG. 2 schematically depicts the FIG. 1 assembly with a buckle arresting means disposed within the interior of an increment of a submerged portion of a pipeline which is generally resting on or located adjacent a submerged surface and which buckle arresting means is operable to traverse and preferably scan or detect a buckle condition of the interior of the submerged pipeline increment and is thereafter operable to immediately prevent the propagation thereof. FIG. 2 also schematically illustrates an upper portion of the pipeline supported on a floating vessel means so as to permit the retrieval of the submerged pipeline increment being scanned. FIG. 2 further schematically illustrates the interconnection of the buckle arresting means with a conventional line-up clamp or pipeline alignment means which is used to longitudinally align a new pipeline joint with the body of the pipeline for welding or interconnecting purposes;

FIG. 3 schematically illustrates the buckle arresting means in the FIG. 2 environment but engaged with a buckle so as to prevent the propagation of the buckle along the longitudinal axis of the pipeline;

FIG. 4 shows an enlarged, longitudinally extending, partial sectional view of the submerged portion of the pipeline shown in FIG. 2 containing the buckle arresting means, the buckle arresting means being shown in partial side elevation within the interior of the longitudinally sectioned pipeline.

DETAILED DESCRIPTION OF THE PREFERRED EMBODIMENT

FIGS. 1 and 2 illustrate the overall enivronment within which the preferred embodiment of the invention may be practiced.

As shown in FIGS. 1 and 2, a pipeline laying installation 10 includes a floating vessel means 12. The floating vessel means 12 comprises a pipelaying barge of the type now used in major offshore laying operations, or for that matter, any vessel operable to effect pipelaying operations.

The vessel means 12 may be provided with pipelaying tensioning means 14 of the wheel or caterpillar type and generally corresponding in mode of operation to the arrangement featured in Lawrence U.S. Pat. No. 3,390,532, the pertinent disclosure of which is hereby incorporated by reference. A buoyant ramp or "stinger" 16 may be pivotally supported at a connection joint 18 to one end of the vessel means 12.

This connecting joint 18 may correspond to the hitch structure featured in Lawrence U.S. Pat. No. 3,390,532; Hauber U.S. Pat. No. 3,280,571; and/or Rochelle et al. U.S. Pat. No. 3,507,126. A series of pipe cradling roller assemblies 20 may be provided on the barge 12 as well as on the stinger 16, in the manner generally described in Lawrence U.S. Pat. No. 3,390,532, so as to provide longitudinal support underlying the pipeline during the laying operation.

Roller or cradle assemblies 20 serve to slidably support a pipeline 22 being laid by the vessel means 12. While a series of such roller assemblies 20 may be used to provide a plurality of pipeline supports spaced longitudinally along the pipeline, only one such support 20 is schematically shown in FIGS. 1 and 2.

As shown in FIGS. 1 and 2, the pipeline laying operation entails the laying of pipeline 22 in a body of water 24. Conventional techniques may be employed to both initiate and terminate the pipeline laying operation depicted in FIGS. 1 and 2.

The pipeline 22 is comprised of a first portion 26 lying on a submerged surface 28. Portion 26, in general, will be substantially completely supported by the submerged surface 28 such that it is no longer subject to buckle inducing tendencies engendered during the pipeline laying operation. However, a buckle occurring in another portion of the pipeline closer to the floating vessel means could propagate along pipeline portion 26 since, once that buckle has occurred, very little external pressure is required to sustain the propagation.

A second pipeline portion 30 will be supported by the tensioning means 14 and roller assemblies 20 of the floating vessel means 12.

A third or intermediate pipeline portion 32 extends through water body 24 between the second pipeline portion 30 and the first pipeline portion 26. It is this third pipeline portion which is subjected to combined bending stresses and relatively high external pressures during a pipeline laying operation. Consequently, when a collapse or buckle occurs in a pipeline being laid along the floor of a deep body of water, the buckle may often occur in the pipeline portion 32.

In general, the intermediate pipeline portion 32 may be viewed as the portion of the pipeline extending from the water surface 34 down to the general location of a "tangency" point 36 where the pipeline moves into substantially full supported engagement with the submerged surface 28.

It will be recognized that the references to pipeline portions 26, 30 and 32 do not refer to specific pipeline segments or joints but rather to general zones of a pipeline profile. It will be further appreciated that during a pipeline laying operation, as water depths vary and as the elevation or configuration of the submerged surface 28 varies, the pipeline zone 32 may undergo changes in shape, profile and/or dimension. In addition, as pipeline laying progresses, the length of portion 26 will continuously increase, with the configuration of portion 26 depending upon the pipe laying route and the configuration of the submerged surface 28 upon which it is resting.

By way of reference, this general mode of pipeline laying is described in Lawrence U.S. Pat. No. 3,390,532. However, it will be appreciated that in view of the preceding and subsequent discussions relating to the inventive contribution herein presented, the invention may be practiced in the context of a variety of pipeline laying techniques, including those described in Lawrence U.S. Pat. No. 3,487,648; Rochelle et al. U.S. Pat. No. 3,507,126; Lawrence U.S. Pat. No. 3,472,034; and other patents and publications.

The general environment of the invention having been discussed, it now becomes appropriate to consider the mode of operation relating to buckle propagation prevention according to the present invention, and structural details of a buckle arresting means which may be employed in the practice of the invention.

FIGS. 2 and 3 schematically depict a buckle arresting means 38 disposed within the interior of pipeline portion 26. This particular buckle arresting means is also operable to detect a buckle condition.

The buckle arresting means 33 may be attached to a flexible draft means 40 such as a rope, cable, or chain which extends therefrom upwardly through the interior of the pipeline body 22.

The draft means 40 may be manipulated to induce relative movement of the buckle arresting means 38 in relation to relatively newly added or additional increments of pipeline portion 26 so as to permit scanning of each new increment of pipeline portion 26 very shortly after such increments have been laid on the submerged surface 28. A suitable technique for manipulating the buckle arresting means, for example by manipulating the draft means 40, may be found in the disclosure of the aforementioned application Ser. No. 147,834 relating to the manipulation of the buckle detecting means disclosed therein. The pertinent disclosure of that application, as applied to operations involving the buckle arresting means 38 disclosed herein (which buckle arresting means also functions as a buckle detecting means as earlier noted) is hereby incorporated by reference. It will, however, be recognized that any suitable manipulative technique may be employed in conjunction with buckle arresting operations according to the present invention.

As will become apparent, by manipulating the draft means 40, an operator can determine at the earliest possible moment, or at least prior to the termination of the pipeline laying operation, the presence of a buckle as the pipeline comes to rest on the submerged surface 28. Desirably, of course, there will be no buckles in the additional increment of pipeline 26, and the buckle arresting means 38 may be permitted to proceed unimpeded through the newly laid pipeline portion.

However, the buckle arresting means is designed to locate pipeline buckles. Such buckles involve a distortion in the pipeline cross section dimensions resulting from a conduit buckling which occurs as pipeline increments move from the barge means 12 through the intermediate zone 32 to the submerged surface 28. Generally, a U-shaped pipeline cross section is presented at the buckle location.

FIG. 1 schematically illustrates the formation of a buckle 42 which has occurred in the intermediate pipeline portion 32. Buckles occurring in the pipeline section 32 have a tendency to propagate along the longitudinal axis of the pipeline in a direction generally from pipeline section 32 towards pipeline section 26. If unimpeded, the buckle 42 may propagate along considerable lengths of pipeline 26 and will remain in the laid pipeline after the termination of the laying operation unless detected and corrected. Such unimpeded propagation is depicted in FIG. 1 with the pipeline section prior to buckling being indicated by dotted lines.

FIG. 3 schematically illustrates the formation of a buckle 42 in the intermediate pipeline portion 32, and, in a manner similar to FIG. 1, depicts some propagation of the buckle longitudinally along pipeline section 32 in the general direction of the pipeline portion 26 resting on the submerged surface. However, according to the present invention, the buckle 42 may be impeded against propagation along that pipeline portion 26 by the presence of the buckle arresting means 38. The buckle 42 is engaged with the buckle arresting means 38, for example at point 44, and the buckle 42 is thereby prevented from further propagating along pipeline 22 in the general direction of pipeline portion 26.

FIG. 4 schematically illustrates structural details of one form of the buckle arresting means 38 that may be employed according to the present invention. The buckle detecting means 38 may include a pair of mutually spaced, circular discs 46 and 48, as in the case of the buckle detecting means illustrated in the aforementioned Jones application, Ser. No. 147,834. However, these discs may be attached to, and enclosed by, a generally cylindrically shaped, and substantially rigid body 50. The generally cylindrical, rigid body 50 contains a plurality of slots 52 to permit the extension of drive wheels 56 to contact the inside surface 58 of pipeline 22. The slots 52 further permit centering wheels 60 to extend through the cylindrical body 50 to engage inside wall 58 in order to keep the buckle detecting means 38 generally coaxial with the longitudinal axis of pipeline 22. Structure, function, and operation of the drive wheels 56 and related elements may be substantially identical to that disclosed in the Jones application Ser. No. 147,834, the pertinent disclosure of which has been incorporated by reference. Apparatus for keeping the buckle arresting means 38 centered in the pipeline and apparatus for supplying motive means to drive wheels 56 are also disclosed in that Jones application Ser. No. 147,834.

As the buckle detector 38 is pulled through pipeline 22 by means of the flexible draft device 40, such as a rope, cable, or chain, which extends from a yoke assembly 64 fixed to the buckle arresting means 38 (see FIG. 4) upwardly through the interior of pipeline body 22, the movement of buckle arresting means 38 relative to pipeline 22 permits scanning of increments of pipeline portion 26 a very short time after such increments have been laid on submerged surface 28. Thus, an operator of the buckle arresting means 38 is able to determine at the earliest possible moment, or at least prior to the termination of the pipeline laying operation, the condition of the pipeline as it comes to rest on the submerged surface 28, since the buckle arresting means may engage an existing buckle and be stopped from further movement thereby.

In this connection, it may be noted that the rigid body 50 surrounding discs 46 and 48 will have an external diameter such as to enable it to move freely through an unbuckled pipeline interior, unimpeded by normal cross-sectional configurations, but be prevented from moving through the interior of a pipeline which has been subjected to buckling or abnormal cross-section distortion.

It will be appreciated that the buckle arresting means 38 employed according to the present invention will be comprised of a sufficiently strong material to withstand and resist forces acting thereon of the type which might normally tend to propagate a buckle. Particularly, the rigid tubular body 50 may be made of steel with a wall thickness preferably greater than that of the pipeline and with an external diameter of at least three-fourths that of the pipeline internal diameter. Moreover, the spaced discs 46 and 48 add further strength operable to resist buckle propagation by reinforcing the rigid body 50 adjacent the ends thereof. Additionally, the length of the buckle arresting means 38 may be relatively short as compared to the length of a pipeline portion (e.g., two or three feet as compared to possibly a few hundred feet or more). The compactness and ruggedness of the arresting means 38 may render the arresting means less susceptible to collapse than the pipeline as a result of forces tending to propagate a buckle.

It may also be noted that a generally frustoconical buckle detecting shoulder 54 at the leading end of the buckle arresting means (see FIG. 4) may be provided. Such a shoulder configuration may be effective to transmit such forces inwardly to the remaining portion of the rigid body 50 in a radially outward direction so as to provide further resistance to propagation.

It will, however, be recognized that other suitable materials and/or configurations may be employed in conjunction with buckle arresting means according to the present invention.

It is envisioned that the buckle arresting means 38 would remain in place and continuously operative to fully prevent propagation even if, upon contact with a buckle, force on the draft means 40 is thereafter removed. In this connection, the wheel means 56 may be helpful in generating frictional resistance to movement of the arresting means 38 further inwardly of the pipeline 26. However, even without such wheel means, it is believed that the arresting means would become lodged. At any rate, continued application of pulling force in the draft means 40 could be employed to resist inward displacement of the arresting means, it being contemplated that the structural integrity of that draft means will be suitable to withstand counter-forces.

The structural and operating characteristics of one form of a buckle arresting means 38 having been reviewed, it is now appropriate to consider the overall manner in which the present invention may be practiced in its preferred form so as to enable the buckle arresting means 38 to perform a pipeline scanning function during the pipeline laying operation itself and to arrest the propagation of a buckle along the longitudinal axis of the pipeline 22.

In operation, the buckle arresting means 38 is first positioned within the interior of the extremity of the pipeline portion 30 on the vessel means 12, with draft means 40 connected to buckle arresting means 38 and extending possibly from a coil or pneumatic winch mechanism schematically depicted by the reference numeral 66. The drive wheels 56 are actuated so as to induce propelling rotation of said wheels, and thereby enable the buckle arresting means 38 to propel itself through the interior of pipeline 22 until a determination is made, based on known profile characteristics of the pipeline, that the buckle arresting means 38 has come to rest either within the first pipeline portion 26 or possibly within another submerged pipeline portion. A pneumatic motivating means for propelling the buckle arresting means 38 is disclosed in the previously identified Jones application Ser. No. 147,834. However, any suitable motive means may be used in the practice of the present invention.

After the buckle arresting means 38 has been appropriately positioned within the pipeline, possibly as generally shown in FIG. 2, a portion of the flexible draft means 40 may be disconnected from coil means 66 and then connected to a pipeline alignment means or line-up clamp 68, as schematically shown in FIG. 2.

A first additional pipeline segment or increment is then manipulated into position in axial alignment with the pipeline terminus and the alignment clamp 68 is drawn into the junction (not shown) between the pipeline body and the new pipeline increment.

Upon completion of a suitable welding operation aboard the barge 12, the barge 12 may be moved ahead (i.e., away from the previously laid pipeline segments) so as to, in essence, displace a new pipeline increment into the first pipeline portion 26.

During this movement, which constitutes a part of the pipeline laying operation, the tensioning means 14 would maintain appropriate controlled tension on the pipeline.

In the event that a buckle is encountered, there would be an inability to move buckle arresting means 38 caused, for example, by engagement of the shoulder 54 with a lower point 44 of the buckle 42 (see FIG. 3). The shoulder 54, discs 46 and 48, and cylindrical body 50 cooperate to withstand the buckle propagating forces, and the buckle is prevented from propagating longitudinally down the length of pipeline 22 in the general direction of pipeline section 26.

The tensioning means 14 may then be operated so as to exert a sufficient tensioning force on the pipeline portion 30 so as to retrieve enough of the previously laid pipeline to bring the increment containing the buckle 42 aboard the vessel 12 as the vessel is moved in a direction reverse to the laying direction. This retrieval of the pipeline increment containing the buckle would also entail the concurrent retrieval of the buckle arresting means 38 itself.

As will be appreciated from the foregoing discussion, the buckle detecting and arresting operation will be conducted while tensioning means 14 remains engaged with the pipeline portion 30. This engagement of the tensioning means 14 with pipeline portion 30 will be such as to enable tensioning means 14 to be operable to retrieve the pipeline in the event that a buckled condition is encountered. This mode of retrieval is described, for example, in Lawrence U.S. Pat. No. 3,390,532.

As shown in FIG. 3, when the buckle arresting means 38 engages with the buckled pipeline, the propagation of the buckle 42 along the longitudinal axis of pipeline 22 towards the general direction of section 26 is impeded. Thus, the operation of the buckle arresting means 38 minimizes the damage to the pipeline 22 as a result of the buckle 42.

In the absence of a buckle detecting means 38, the buckle 42 could propagate along the longitudinal axis of pipeline 22 in the general direction of pipeline segment 26 and continue to propagate along the pipeline segment 26 for an undetermined length depending upon conditions of pressure and physical characteristics of the pipeline.

The condition wherein the buckle propagates along a substantial length of the pipeline 22 is shown schematically in FIG. 1. In FIG. 1, the buckle 42 has propagated along the longitudinal axis of pipeline 22 into pipeline portion 26.

A principal advantage of the present invention resides in the provision of a technique which enables buckles in submerged pipelines to be arrested during the laying operation and thereby be prevented from propagating along the length of the already laid pipeline.

The presence of a buckle may be determined almost as soon as a defective section has come to rest on the submerged surface so as to enable repairs to be made as expeditiously as possible, and significantly, the extent of the defective section is limited by buckle propagation prevention according to the present invention.

The necessity of resorting to underwater repairs or costly repairs initiated after pipeline laying has been completed may be avoided, and such repairs as may be necessitated are minimized by limitations upon buckle propagation.

The method described heretofore enables an operator to ensure a customer at the completion of the laying operation, without further delay, that the pipeline has been scanned for buckles and in this respect is in an acceptable condition. In this manner, delays involving subsequent inspection operations for buckles are avoided and the pipeline may be placed in operating condition more quickly. Such savings in time are particularly significant where weather conditions or other factors limit the time available to complete pipeline laying operations and place pipelines in operating condition. However, should delays between buckle detection and corrective measures be encountered, the risk of additional cost by reason of buckle propagation is minimized since the buckle arresting means may remain in a rest position in the pipeline continually operable to prevent buckle propagation.

In performing these buckle detecting and arresting operations concurrently with the pipeline laying operation itself, a substantial savings in time and money is effected which could amount to substantial savings in a typical pipeline laying operation. The invention is therefore of considerable advantage and utility.

Various changes in the details of the described preferred form of the invention may be made without departing from the spirit or scope of the invention as defined in the appended claims. The nature and objects of the present invention having been completely described and illustrated, and the best mode and embodiment contemplated set forth herein,

What is claimed is:

1. A method of arresting the propagation of a buckle in a pipeline being laid on a submerged surface of a body of water from a floating vessel means, wherein the buckle is caused by overstressing an intermediate portion of the pipeline between an upper portion of the pipeline supported by the floating vessel means and a lower portion of the pipeline supported by the submerged surface, the buckle being generated along the intermediate portion of the pipeline and tending to propagate at least toward the lower portion of the pipeline, said method comprising the steps of:
positioning buckle arresting means within the interior of at least one of the intermediate and the lower portions of the pipeline,
said buckle arresting means being operable to prevent the propagation of a buckle from said intermediate pipeline portion to said lower pipeline portion and
moving the floating vessel means relative to the pipeline to pay out the pipelines toward the submerged surface, while moving the buckle arresting means relative to the paid out pipeline, with the buckle arresting means providing impedance against the propagation of any generated buckles.

2. A method of arresting the propagation of a buckle in a pipeline in accordance with claim 1 wherein:
said pipeline is overstressed so as to generate a buckle therein with said buckle tending to propagate toward said lower pipeline portion; and
said buckle arresting means engages with said buckle forward of said lower pipeline portion so as to prevent the propagation of said buckle beyond said buckle arresting means.

3. A method of arresting the propagation of a buckle in a pipeline being laid on a submerged surface of a body of water from a floating vessel means, said method comprising the steps of:
supporting the pipeline with,
an upper portion supported by the floating vessel means,
a lower portion lying on the submerged surface, and
an intermediate submerged portion supported in a water body between said upper and lower portions;
providing buckle arresting means within the interior of at least one of said lower and intermediate pipeline portions,
said buckle arresting means being operable to prevent the propagation of a buckle from said intermediate pipeline portion to said lower pipeline portion;
moving said buckle arresting means through the interior of said pipeline between the commencement and termination of the laying thereof;
overstressing said intermediate pipeline portion so as to generate a buckle therein, with said buckle tending to propagate toward said lower pipeline portion; and
engaging said propagating buckle with said buckle arresting means so as to prevent the propagation of said buckle beyond said buckle arresting means.

4. A method of arresting the propagation of a buckle in a pipeline in accordance with claim 3 wherein:
said buckle arresting means is provided within the interior of said lower pipeline portion.

5. A method of arresting the propagation of a buckle in a pipeline in accordance with claim 3 wherein:
said buckle arresting means is provided within the interior of said intermediate pipeline portion.

6. A method of arresting the propagation of a buckle in a pipeline in accordance with claim 3 wherein:
in the step of moving said buckle arresting means through the interior of said pipeline between the commencement and termination of the laying thereof, said buckle arresting means is attached to said floating vessel means so as to create relative motion between said pipeline and said buckle arresting means as said floating vessel means moves relative to said pipeline.

7. A method of arresting the propagation of a buckle in a pipeline in accordance with claim 3 wherein:
in the step of engaging said propagating buckle with said buckle arresting means so as to prevent the propagation of said buckle beyond said buckle arresting means, said buckle arresting means becomes lodged in said pipeline by said buckle.

8. A method of arresting the propagation of a buckle in a pipeline in accordance with claim 3 wherein:
in the step of moving said buckle arresting means through the interior of said pipeline,
said propagating buckle is engaged with said buckle arresting means so as to lodge said buckle arresting means in said pipeline; and further including the step of
removing a flexible draft means attached to said buckle arresting means.

* * * * *